United States Patent [19]

McKillip et al.

[11] 4,436,303
[45] Mar. 13, 1984

[54] PHYSICAL THERAPY APPARATUS

[76] Inventors: James B. McKillip, 15243 Vanowen, Van Nuys, Calif. 91405; Edmund J. Brown, 3186 N. Rossini St., Topanga, Calif. 90290

[21] Appl. No.: 283,929

[22] Filed: Jul. 18, 1981

Related U.S. Application Data

[63] Continuation of Ser. No. 173,613, Jul. 30, 1980, abandoned, which is a continuation of Ser. No. 937,070, Aug. 28, 1978, abandoned.

[51] Int. Cl.³ .............................................. A63B 21/22
[52] U.S. Cl. ............................. 272/132; 272/DIG. 4; 280/43.24
[58] Field of Search .................. 272/131, 73, 70.3, 67, 272/900, DIG. 3, 132; 128/25 R; 280/43 R, 43.24, 765

[56] References Cited

U.S. PATENT DOCUMENTS

| 2,777,439 | 1/1957 | Tuttle | 272/132 X |
| 3,520,547 | 7/1970 | Anthony | 280/43.24 |
| 3,848,870 | 11/1974 | Craig | 272/67 |

FOREIGN PATENT DOCUMENTS 2121877 12/1972 Fed. Rep. of Germany .... 128/25 R

Primary Examiner—Richard J. Apley
Assistant Examiner—William R. Browne
Attorney, Agent, or Firm—Jeffrey G. Sheldon

[57] ABSTRACT

A wheel mounted physical therapy apparatus capable of being positioned for operation by a patient, then fixed in position, the apparatus including an arm structure having a wide range of adjustment to permit operation by virtually any preselected back and forth movement of the patient's body, arms or legs or portions thereof, the resistance force to such back and forth movement being separately adjustable to provide lesser or greater resistance in either direction.

10 Claims, 12 Drawing Figures

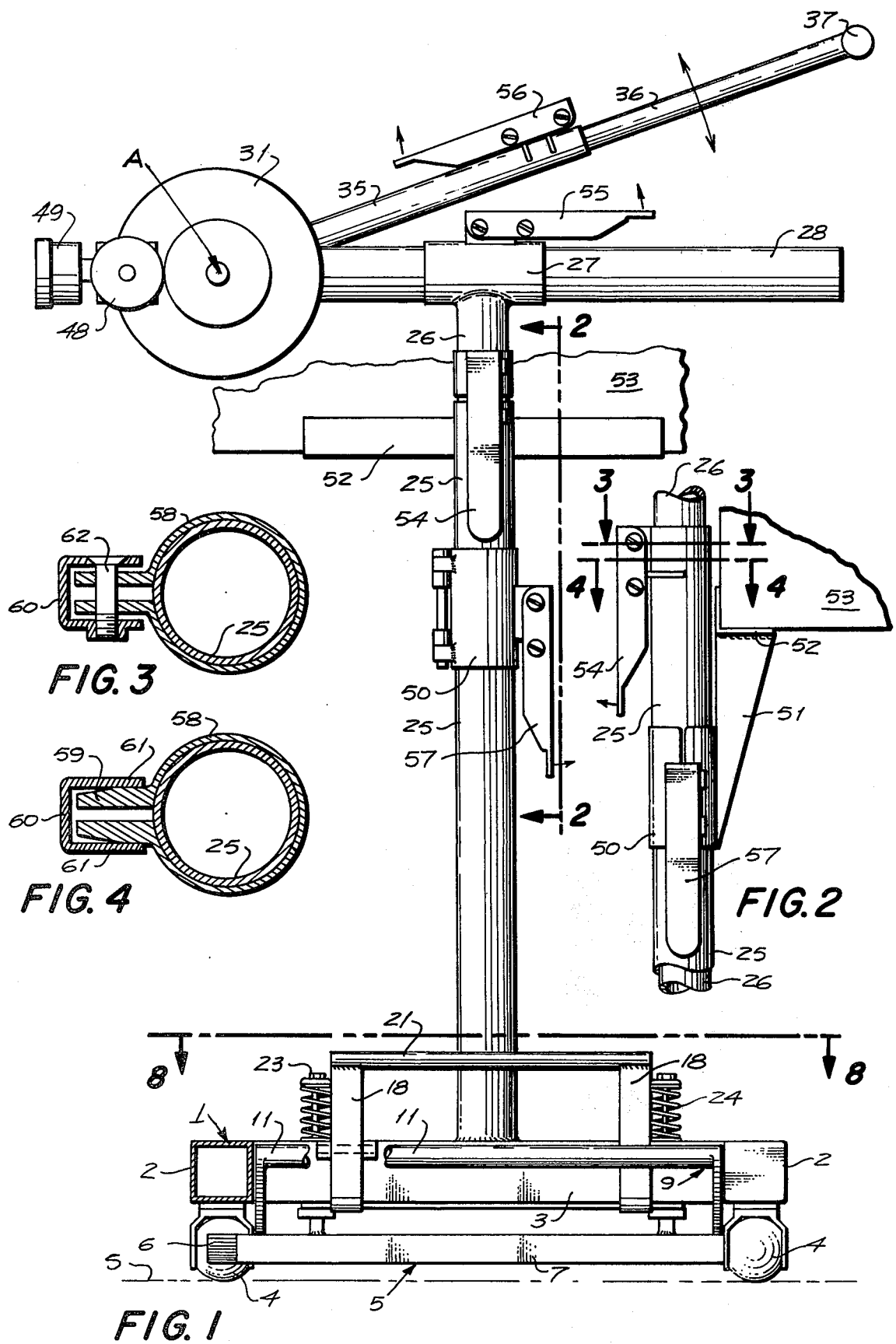

PHYSICAL THERAPY APPARATUS

CROSS-REFERENCES

This application is a continuation of application Ser. No. 173,613 filed July 30, 1980, now abandoned, which is a continuation of application Ser. No. 937,070, filed Aug. 28, 1978, now abandoned.

BACKGROUND AND SUMMARY

Apparatus designed to aid in physical therapy are presently in use, and are represented by Pat. Nos. 2,855,199 and 3,465,592. The present invention is directed to physical therapy apparatus, and is summarized as follows:

First, to provide a physical therapy apparatus which includes a novelly arranged variable force resisting unit having an arcuately movable arm actuated by an arcuately movable portion of a patient in opposition to the force resisting unit.

Second, to provide a physical therapy apparatus, as indicated in the previous object, wherein a pair of force resistance units are provided which are essentially freely movable in first opposing directions and are resistant to movement in second opposing directions, whereby resistance to exercise movement in one direction may differ from the resistance to exercise movement in the opposite direction.

Third, to provide a physical therapy apparatus, as indicated in the other objects, which includes a frame structure capable of a wide range of adjustment so as to be readily placed to perform the desired exercise movement of the patient whether it be the head, body, arms or legs of the patient, or portions or combinations thereof.

Fourth, to provide a physical therapy apparatus, as indicated in the other objects, wherein the frame structure is mounted on rollers and includes readily operable means to deactivate the rollers for exercise by the patient, and which further includes a novelly arranged and easily manipulated member adapted for engagement with an exercise bed or chair to further secure the frame structure against movement except the portion engaged by the patient.

BRIEF DESCRIPTION OF THE FIGURES

FIG. 1 is a side view of the physical therapy apparatus.

FIG. 2 is a fragmentary view taken at right angles to FIG. 1 in the plane 2—2.

FIG. 3 is an enlarged transverse sectional view of one of the clamp units taken through 3—3 of FIG. 2.

FIG. 4 is a similar enlarged transverse sectional view taken through 4—4 of FIG. 2.

DETAILED DESCRIPTION

Figure 5:
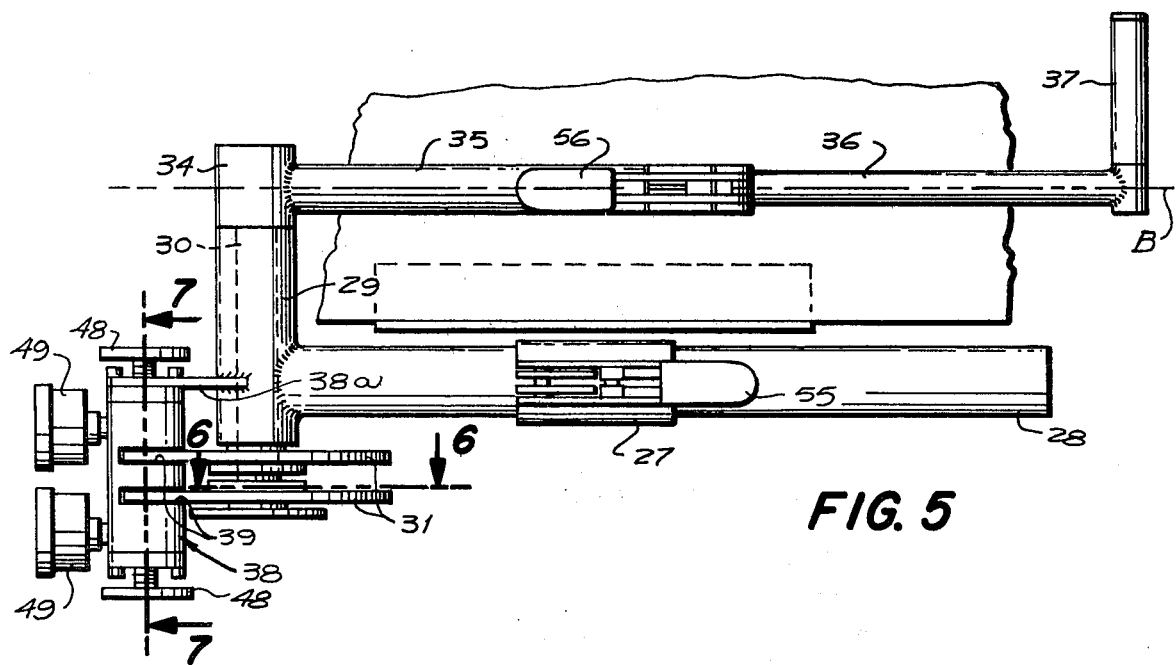
FIG. 5 is a plan view of the physical therapy apparatus with the bottom frame structure omitted for clarity.
Figure 6:
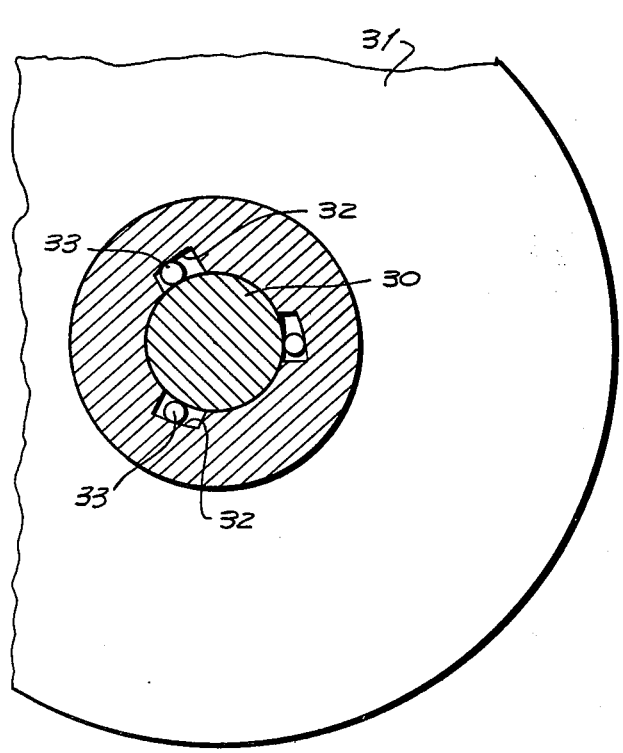
FIG. 6 is an enlarged fragmentary sectional view taken through 6—6 of FIG. 5.

The physical therapy apparatus includes an H-shaped base frame 1 having parallel members 2 joined by a cross member 3. The base frame is supported on rollers 4.

Underlying the base frame 1 is an H-shaped stabilizing frame 5 having parallel members 6 and a cross member 7. A pair of pivot brackets 8 depend from the parallel members 2 and pivotally support a depressing member 9 having a lever arm 10 adjacent each parallel member 2 joined by a connecting bar 11. The lever arms 10 have nodules 10a intermediate their ends for exerting a downward force on the cross member 7 of the H-frame 5.

Figure 9:
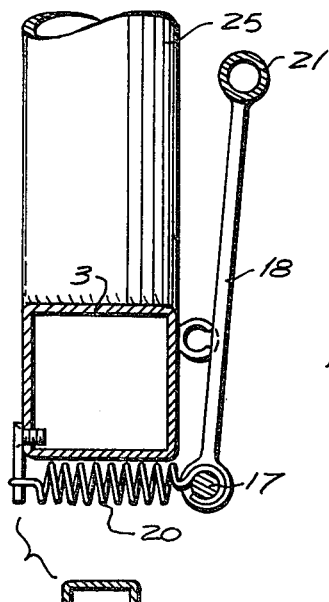
FIG. 9 is an enlarged fragmentary sectional view taken through 9—9 of FIG. 8.
Figure 10:
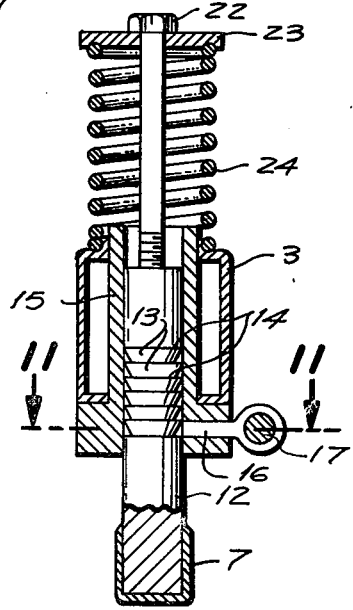
FIG. 10 is an enlarged fragmentary sectional view taken through 10—10 of FIG. 8.
Figure 11:
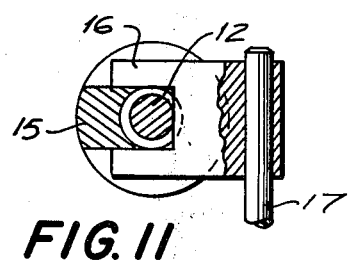
FIG. 11 is an enlarged fragmentary sectional view taken through 11—11 of FIG. 10.

The cross member 7 adjacent each parallel member 6 is provided with an upwardly directed latching bar 12 having conical latching elements 13 forming latching shoulders 14. Each latching bar is received in a guide sleeve 15 extending through the cross member 3 as shown in FIG. 10. Each guide sleeve 15 is provided with a horizontal slot which receives a keeper plate 16 engagable with the latching elements 13. The two keeper plates are joined by a connecting bar 17 which extends parallel with the cross members 3 and 7. The connector bar is provided with spaced lever arms 18 pivotally joined intermediate their ends to the cross member 3 as shown in FIG. 9. The connecting bar 17 is joined to the underside of the cross member 3 by appropriate springs 20 so that the keeper plates 16 are urged toward the latching elements 13. The upper ends of the lever arms 18 are joined by a cross bar 21.

The upper ends of the latching bars 12 are provided with bolts 22 and washers 23. Interposed between the washers 23 and the upper surface of the cross member 3 is a pair of springs 24. The pair of springs 24 urge the stabilizing frame 5 upwardly.

Figure 12:
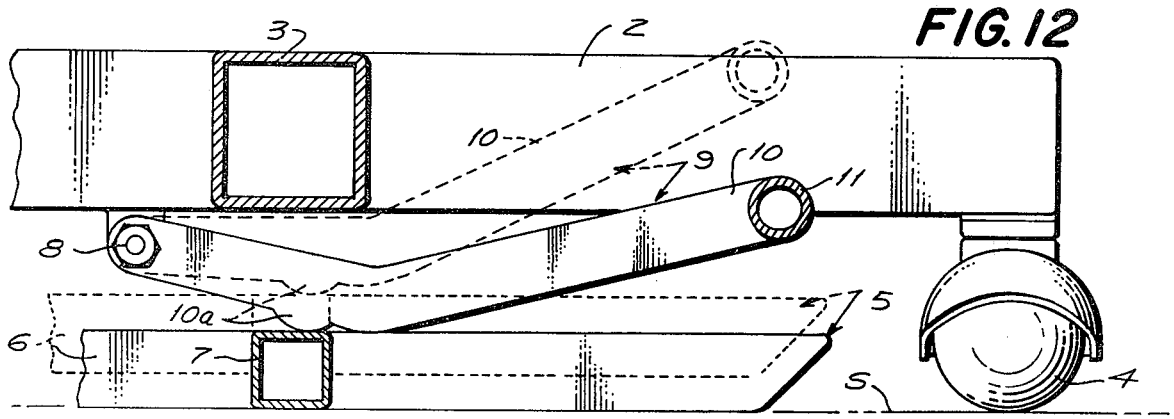
FIG. 12 is an enlarged fragmentary sectional view taken through 12—12 of FIG. 8.

The depressing lever 9 is so positioned that its connecting bar 11 may be engaged by one's foot so as to be depressed for engagement with the cross member 7 of the stabilizing frame 5 to force the frame downwardly against an underlying floor surface S and thereby raise the H-frame 1 and rollers 4, as indicated in FIG. 12. In doing so, the keeper plates engage the latching elements 13. Release of the stabilizing frame 5 is accomplished by foot engagement with the cross bar 21 which withdraws the keeper plates 16.

Centered with respect to the cross member 3 is a vertically disposed tubular post 25; and slidable therein is an extension post 26 having at its upper end a cross sleeve 27 which receives a horizontal tube 28. The horizontal tube is provided at one end with a cross sleeve 29 as shown in FIG. 5.

Journalled in the cross sleeve 29 is a clutch shaft 30, one end of which protrudes from the cross sleeve and receives a pair of clutch discs 31. The clutch discs 31 are provided with clutch slots 32 and clutch rollers 33. The clutch slots 32 are so arranged that when the clutch shaft 30 is turned in one direction, one clutch disc 31 turns therewith, and when the clutch shaft is turned in the opposite direction, the other clutch disc turns therewith.

The clutch shaft 30 is joined to a short cross sleeve 34 disposed coaxially with the cross sleeve 29. The cross sleeve 34 forms the base end of a patient actuating unit. The cross sleeve 34 is joined to a radially extending sleeve 35 which receives an extension member 36. The extremity of the extension member 36 is provided with a lateral arm 37 for engagement by the patient.

Figure 7:
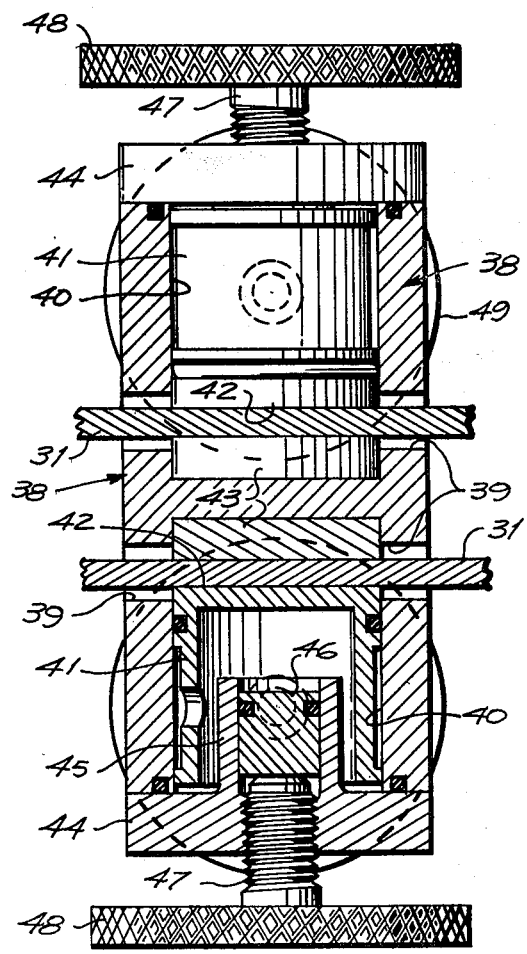
FIG. 7 is an enlarged fragmentary sectional view taken through 7—7 of FIG. 5.
Figure 8:
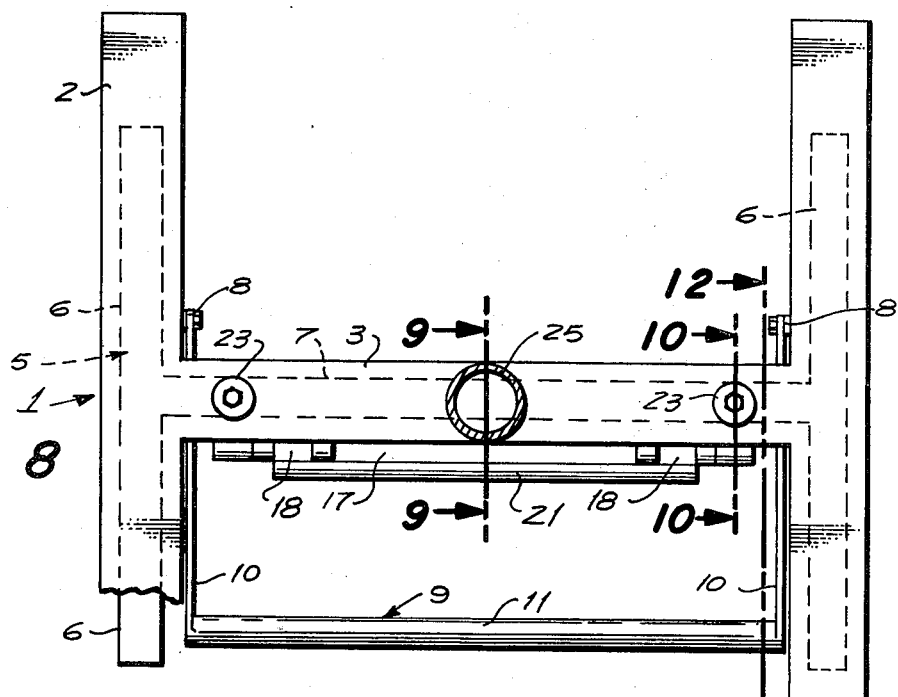
FIG. 8 is a sectional view taken through 8—8 of FIG. 1 showing the base structure fragmentarily and in plan.

The clutch discs 31 includes peripheral portions which are received in force adjusting units including a common housing 38 secured to the cross sleeve 29 by a bracket 38a and has a pair of slots 39 which receive peripheral portions of the clutch discs 31. Referring to FIG. 7, the housing 38 forms a pair of oppositely directly cylinders 40 which receive a pair of pistons 41; one end 42 of each piston engages a corresponding clutch disc 31. The piston ends 42 are disposed in alignment with backup discs 43 at the opposite side of the corresponding clutch disc 31.

Each cylinder 40 is provided with a cover disc 44 secured thereto by appropriate screws, not shown. Each cover disc 44 is provided with a pilot cylinder 45 which receives a pilot piston 46. The cover disc is provided with a screw-threaded bore aligned with its pilot cylinder 45 which receives a screw shaft 47 having a handle flange 48. The cylinders 40 are connected to corresponding pressure gauges 49.

The cylinders 40 and the main pistons 41 which are hollow are completely filled with a pressure fluid. Inward movement of the pilot piston 46 in each cylinder increases the pressure therein and increases the friction between pistons 41 and their corresponding clutch discs 31. Conversely, outward movement reduces the force applied to the clutch discs 31.

As shown in FIGS. 1, 2 and 3, it is intended for most uses of the physical therapy apparatus that the apparatus be secured with respect to a patient's table or plinth or chair or other suitable means on which the patient is placed. To accomplish this, the vertical post 25 is provided with a vertically slidable sleeve 50 from which extends an offset vertical arm 51, the upper end of which is provided with a bracket 52. For purposes of illustration, the bracket is shown as engaging the underside of a patient's table 53 indicated fragmentarily in FIGS. 1 and 5.

The various units of the physical therapy apparatus are adjustably connected by tubular clamps which are essentially similar in construction. More specifically, the vertical post 25 and extension post 26 are joined by a clamp 54; the cross sleeve 27 and horizontal tube 28 are joined by a clamp 55; the base sleeve 35 and extension member 36 are joined by a clamp 56; and the sleeve 50 and vertical post 25 are joined by a clamp 57.

As shown in FIGS. 3 and 4, each clamp includes a tubular clamp portion 58 having a pair of cam lugs 59 and a pivotal handle 60 having cam engaging portions 61. A pivot projection 62 provides a pivotal axis for the handle 60.

To secure the physical therapy apparatus to the patient's table, the sleeve 50 is adjusted so that the bracket 52 fits under the patient's table 53 in close proximity thereto. The bar 11 is pressed downward pressing the bracket 52 upwardly to engage the patient's table, and lift the table slightly. To remove the physical therapy apparatus, the bar 21 is engaged to release the bracket 52 from the table 53.

The physical therapy apparatus is capable of quick adjustment to a wide range of positions, assuming that the apparatus when in use, is essentially as shown in FIGS. 1 and 5. This position of the apparatus is suitable for treatment of the patient's right arm assuming that the patient is positioned face upward. The apparatus is secured to the table in position to place the Axis A of the shaft 30 and clutch discs 31 in the vertical plane of the right shoulder axis. The axis A is adjusted vertically by movement of the sleeve 26 until the axis A coincides with the horizontal plane of the patient's shoulder axis. The resistance to clutch movement in each direction is adjusted by handles 48. The distance between axis A and the arm 37 is adjusted so that the patient may grasp the arm 37 and oscillate his hand and arm about the axis A. All of these adjustments can be made in a few minutes.

If the patient's left arm is to be treated, the apparatus is placed at the left side of the table or the position of the patient is reversed (permitting one side of the table to be adjacent a wall) and the clutch unit turned 180° about the vertical axis of the sleeve 26. Also adjustment of the clutches are reversed.

If the forearm only is to be treated the Axis A is positioned to coincide with the elbow.

If the treatment of the hand and wrist is required, the clutch shaft 30 may have an appropriate extension. Alternatively, the shaft 30 may have a cross bar, then by aligning the forearm with axis A a different exercise of the wrist may be obtained.

If treatment of the patient's leg or portion thereof is desired, the apparatus is positioned similar to the arrangement for arm treatment, except that an appropriate loop is secured to the patient actuated unit in place of the hand gripped arm 37.

While for many treatments, the physical therapy apparatus is attached to the table, treatment may be accomplished with the apparatus separate from the table, but with the wheels 4 lifted. For example, a patient may lay face down with one arm at the side of the table and move downwardly along the side of the table.

While several examples of the use of the physical therapy apparatus have been indicated, the apparatus may be utilized for other special treatment movement.

I claim:

1. An apparatus suitable for physical therapy comprising:
    (a) a frame structure;
    (b) an angularly movable shaft carried by the frame structure and engaged by a patient;
    (c) (i) first and second clutch discs mounted on the shaft, (ii) a first one way drive means for moving the first clutch disc with the shaft only when the shaft angularly moves in a first direction, and (iii) a second one way drive means for moving the second clutch disc with the shaft only when the shaft angularly moves in a second direction opposite the first direction; and
    (d) a pair of frictional adjusting means mounted proximate to the clutch discs, each adjusting means comprising a cylinder containing hydraulic fluid, a piston positioned in each cylinder for engaging a respective one of the clutch discs, and means associated with each cylinder for varying the pressure of the hydraulic fluid in each cylinder for varying the friction between each piston and its respective clutch disc, and thereby independently varying the frictional resistance of the shaft's angular movement alternately in the first direction and then in the second directions.

2. The apparatus of claim 1 in which the adjusting means share a common housing and are coaxial.

3. The apparatus of claim 1 in which the pistons engage only the peripheral portions of the clutch discs.

4. The apparatus of claim 1 in which each adjusting means includes a pressure gauge responsive to pressure of the hydraulic fluid.

5. The apparatus of claim 1 wherein the shaft is angularly movable about the longitudinal axis of an elongated cross member, the apparatus comprising:
   (a) a base resting on the ground and having a vertical longitudinal axis;
   (b) means for varying the length of the shaft;
   (c) means for rotating the shaft about its own longitudinal axis;
   (d) means for varying the height of the cross member and the shaft above the base;
   (e) means for rotating the shaft about a horizontal axis extending through the cross member;
   (f) means for rotating the shaft and the cross member about the vertical longitudinal axis of the frame structure; and
   (g) means for laterally moving the shaft and the cross member relative to the vertical axis of the frame structure.

6. The apparatus of claim 5 wherein the frame structure comprises:
   (a) a roller supported fixed base frame;
   (b) a second base frame carried by the fixed base frame and vertically movable relative to the fixed base frame;
   (c) a vertically disposed, longitudinally adjustable post carried by the fixed base frame;
   (d) a bracket mounted on the post for engaging the underside of a fixed horizontal surface; and
   (e) manually operated means for raising the second base frame for roller movement of the fixed base frame and the second base frame over an underlying surface, the manually operated means also being capable of lowering the second base frame to the underlying surface to restrain the frames from roller movement while simultaneously raising the fixed base frame to bring the bracket into engagement with the fixed horizontal surface.

7. The apparatus of claim 1 wherein the frame structure comprises:
   (a) a roller supported fixed first base frame;
   (b) a second base frame carried by the fixed base frame and vertically movable relative to the fixed base frame;
   (c) a vertically disposed longitudinally adjustable post carried by the fixed base frame;
   (d) a bracket mounted on the post for engaging the underside of a fixed horizontal surface; and
   (e) manually operated means for raising the second base frame for roller movement of the fixed first base frame and the second base frame over an underlying surface, the manually operated means also being capable of lowering the second base frame to the underlying surface to restrain the frames from roller movement while simultaneously raising the fixed first base frame to bring the bracket into engagement with a fixed horizontal surface.

8. An apparatus useable for physical therapy comprising:
   (a) a frame structure having a vertical longitudinal axis and including a base resting on the ground;
   (b) a shaft carried by the frame structure and engageable by a patient, the shaft being angularly movable about an elongated cross member in both the forward and reverse directions;
   (c) means for varying the resistance of the shaft to said angular motion;
   (d) means for varying the length of the shaft;
   (e) means for rotating the shaft about its own longitudinal axis;
   (f) means for varying the height of the cross member above the base;
   (g) means for rotating the shaft about a horizontal axis extending through the cross member;
   (h) means for rotating the shaft and the cross member about the vertical longitudinal axis of the frame structure; and
   (g) means for laterally moving the shaft and the cross member relative to the vertical longitudinal axis.

9. The apparatus of claim 8 wherein the frame structure includes:
   (a) a roller supported fixed base frame;
   (b) a second base frame carried by the fixed base frame and vertically movable relative to the fixed base frame;
   (c) a vertically disposed, longitudinally adjustable post carried by the fixed base frame;
   (d) a bracket mounted on the post for engaging the underside of a fixed horizontal surface; and
   (e) manually operated means for raising the second base frame for roller movement of the fixed base frame and the second base frame over an underlying surface, the manually operated means also being capable of lowering the second base frame to the underlying surface to restrain the frames from roller movement while simultaneously raising the fixed base frame to bring the bracket into engagement with the fixed horizontal surface.

10. An apparatus suitable for physical therapy comprising:
   (a) a roller supported fixed base frame;
   (b) a second base frame carried by the fixed base frame and vertically movable relative to the fixed base frame;
   (c) a vertically disposed, longitudinally adjustable post carried by the fixed base frame;
   (d) a bracket mounted on the post for engaging the underside of a fixed horizontal surface; and
   (e) manually operated means for raising the second base frame for roller movement of the fixed base frame and the second base frame over an underlying surface, the manually operated means also being capable of lowering the second base frame to the underlying surface to restrain the frames from roller movement while simultaneously raising the fixed base frame to bring the bracked into engagement with the fixed horizontal surface.

* * * * *